(12) United States Patent
Belkhir

(10) Patent No.: US 7,085,003 B1
(45) Date of Patent: Aug. 1, 2006

(54) FRINGE FIELD TAILORING WITH SUB-PIXEL PATTERNS FOR IMPROVED PRINT QUALITY

(75) Inventor: Lotfi Belkhir, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/389,271

(22) Filed: Sep. 2, 1999

(51) Int. Cl.
*H04N 1/409* (2006.01)
*G06T 5/00* (2006.01)

(52) U.S. Cl. .................. 358/1.9; 358/3.27; 382/269

(58) Field of Classification Search ............ 358/1.9, 358/3.24, 3.27, 300, 2.99, 3.02, 3.15, 3.09, 358/3.11, 3.12; 347/131, 252; 399/51; 382/266, 382/269
See application file for complete search history.

(56) References Cited

U.S. PATENT DOCUMENTS

| | | | |
|---|---|---|---|
| 3,784,397 A | 1/1974 | Sato et al. | |
| 4,544,264 A | 10/1985 | Bassetti et al. | 347/131 |
| 4,847,641 A | 7/1989 | Tung | 347/131 |
| 4,868,600 A | 9/1989 | Hays et al. | |
| 5,029,108 A | 7/1991 | Lung | 358/1.9 |
| 5,274,472 A | 12/1993 | Williams | |
| 5,479,175 A | 12/1995 | Cianciosi et al. | 347/252 |
| 5,650,858 A * | 7/1997 | Lund | 358/3.15 |
| 6,185,003 B1 * | 2/2001 | Oyen | 358/1.9 |
| 6,333,998 B1 * | 12/2001 | Matsumoto | 382/217 |

OTHER PUBLICATIONS

Robert J. Meyer and Allen T. Retzlaff, Jr. entitled "Auxiliary Pixel Patterns for Improving Print Quality", U.S. application No. 09/362,021, filed Jul. 27, 1999 (D/96602).
Robert J. Meyer and Allen T. Retzlaff, Jr. entitled "Improved Digital Halftone with Auxiliary Pixels", U.S. application No. 09/362,022, filed Jul. 27, 1999 (D/96602Q1).
Robert J. Meyer and Allen T. Retzlaff, Jr. entitled "Non--Printing Patterns for Improving Font Print Quality", U.S. application No. 09/362,020, filed Jul. 27, 1999 (D/96602Q2).

* cited by examiner

*Primary Examiner*—Scott Rogers
(74) *Attorney, Agent, or Firm*—Christopher D. Wait

(57) ABSTRACT

Utilization of fringe field tailoring pixels with sub-pixel patterns are introduced into the bitmap of an image to obtain local control of the normal and tangential electric fields and thereby improve image development. These fringe field tailoring pixels embody multiple sub-pixel pulses so as to alter the electric fields as developed upon the photoreceptor. These fringe field tailoring pixels compensate for the otherwise undesirable electric fringe fields as found on the edge of image shapes. These undesirable fringe fields pull toner away from image edges and cause other "slow toner" effects, particularly in high speed systems. Application of fringe field tailoring pixels with their sub-pixel patterns to the edge of an image shape modifies the fringe electric fields so as to encourage pulling toner onto the photoreceptor at the image edge. This ensures adequate toner supply to all parts of the image so that the desired printing pixels will print as intended.

12 Claims, 6 Drawing Sheets

FRINGE FIELD TAILORING WITH SUB-PIXEL PATTERNS FOR IMPROVED PRINT QUALITY

RELATED CASES

Cross reference is made to the following related applications incorporated by reference herein: U.S. application Ser. No. 09/362,201 entitled "Auxiliary Pixel Patterns For Improving Print Quality" by Robert J. Meyer and Allen T. Retzlaff, Jr.; U.S. application Ser. No. 09/362,022 entitled "Improved Digital Halftone With Auxiliary Pixels" by Robert J. Meyer and Allen T. Retzlaff, Jr.; U.S. application Ser. No. 09/362,020 entiled "Non-Printing Patterns for Improving Font Print Quality" by Robert J. Meyer and Allen T. Retzlaff, Jr.

BACKGROUND OF THE INVENTION AND MATERIAL DISCLOSURE STATEMENT

The present invention relates to improving images produced by electrostatographic printers and copiers and more particularly, concerns solving the image problems of edge delineation, and edge deletion and or displacement in an image. Such edge deletion and displacement problems may manifest themselves as phenomena typically referred to as line shrinkage, halo, and white gap artifacts. These artifacts are also sometimes referred to as "slow toner" effects as well, although slow toner is only one of several root causes that lead to the same defect.

In a typical electrophotographic printing machine, a photoreceptor is charged and exposed to record an electrostatic latent image therein. The photoreceptor is advanced to a development station where toner is deposited on the latent image. One type of development system forms a toner cloud in the development zone. An example of this type of development system is described is U.S. Pat. No. 4,868,600, which is herein incorporated in its entirety by reference.

It has been found that when a toner powder cloud development system is used, large amounts of toner are deposited where there is an uninterrupted expanse of charged area (such as toward the middle of large image shapes), and toner is starved from locations where there is a strong or sudden change in charge (as found with narrow lines or shapes and on the edges of larger shapes). The result is edge displacement. The effect on large shapes causes them to exhibit a defect called halo, which manifests itself most clearly at the interfaces of solid colors. Halo in color systems appears as white space or lines at interfaces which should otherwise be a perfect match between two colors. This defect is also observable in single color images as an edge distortion or displacement and line shrinkage dependent on the size of the printed object. Line shrinkage of course leads to poor line and text quality due to an erosion or shrinkage of the line edges and corners. Various approaches have been devised to solve these toner deflection effects.

The following patents appear to be relevant to manipulation and enhancement of the edge of image shapes.

In U.S. Pat. No. 4,847,641 to Tung, print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

U.S. Pat. No. 4,544,264 to Bassetti et al. discloses an electrophotographic printing machine with circuits to enhance the printing of fine lines, such as lines of a single picture element (pel) in width. Provision is made for broadening such lines in one dimension by adding small "black" areas to each edge of the fine line in order to broaden it. In a second dimension, perpendicular to the first dimension, lines are broadened by placing gray pels next to black pels. The disclosure also discusses specific cases in which it may be considered desirable to inhibit the enhancement signals.

U.S. Pat. No. 5,029,108 to Lung discloses an edge enhancement method and apparatus for dot matrix devices wherein a group of gradient mask matrices are applied to a "current matrix", wherein a target pixel is surrounded by neighboring pixels, to determine if the target pixel is at a location where a change of brightness occurs. From this matrix operation, a conclusion is derived as to the existence or non-existence of an edge and the direction of the brightness change. The current matrix and a predetermined number of previously evaluated and yet to be evaluated pixels are then compared to a set of reference bit patterns which depict possible segment changes to be corrected. If the result indicates that the target pixel is on an edge of a changing edge segment, a corresponding code will be generated to modify the target pixel to enhance the smoothness of a segment transition. In the case of an electrophotographic printing machine, the specific code will change either the location or the size of the target pixel; whereas in the case of a monochrome screen display, the specific code will change the intensity of the target pixel.

U.S. Pat. No. 5,479,175 to Cianciosi et al. discloses an apparatus for enhancing the output along edges of discharged area developed regions in a tri-level imaging system employing a pulse width and position modulated signal ROS for exposure. This enables the identification and selective alteration of video data used to drive the ROS so as to extend the developed regions by a selected amount and eliminate digitization artifacts present in the image to be printed. The extension of the discharged area developed regions is accomplished by extending the width of, or adding separate, exposure pulses in adjacent areas to enable development within a portion of those regions.

U.S. Pat. No. 3,784,397 discloses a method for forming images by providing an electrostatographic imaging member bearing an electrostatic latent image on a recording surface. Then positioning the recording surface spaced from and facing a development electrode. This is followed with contacting the recording surface with toner particles whereby at least a portion of the toner particles deposit on the recording surface to form at least a partially imaged recording surface. Then maintaining the field strength of the development electrode as weak during the initial period of development and then increasing the field strength of the development electrode during the latter period of development, to form a substantially uniform developed image substantially free of streak, halo, edge effect, and background deposits.

Therefore, there exists a need for techniques which will solve these halo and slow toner effects. Further, there exists a demand for increasing the throughput of printing and digital imaging systems without incurring or exacerbating these problems. Thus, it would be desirable to solve these and other deficiencies and disadvantages.

SUMMARY OF THE INVENTION

The present invention relates to an improved print image comprising an original image including a plurality of original pixels. The invention further comprises a fringe field tailoring pixel having a sub-pixel pattern which replaces one of the plurality of original pixels for enhancing the printing of the original image.

Another aspect of the present invention relates to a method for improving the printing of an image. The method comprises receiving a source image of original pixel data and processing that source image to embed fringe field tailoring pixels into the original pixel data.

DESCRIPTION OF THE INVENTION

Figure 1:
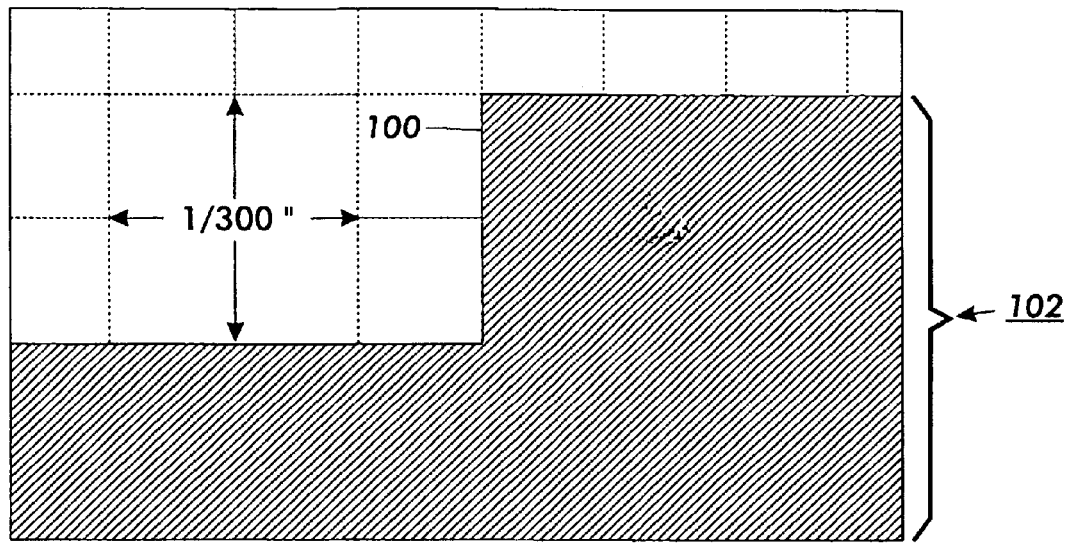
FIG. 1 is part of a line, hypothetically rendered at 300×300 dpi.

For a general understanding of the present invention, reference is made to the drawings. In the drawings, like reference numerals have been used throughout to designate identical elements. In describing the present invention, the following term(s) have been used in the description.

An "image" is a pattern of physical light. It is understood that an image may be further comprised of shapes. An image as such, may include characters, words, and text as well as other features such as graphics. An image may be divided into "segments" or "regions", each of which is itself an image. A region of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." A "pixel" is the smallest segment of an image whose value is indicated in an item of data defining the image. In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color form" of an image, the binary form, gray scale form, and color form each being a two-dimensional array defining an image.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

A "version" of a first image is a second image produced using an item of data defining the first image. The second image may be identical to the first image, or it may be modified, such as by image processing operations.

An "image input terminal" (IIT) is a device that can receive an image and provide an item of data defining a version of the image. A "scanner" is an image input device that receives an image by a scanning operation, such as by scanning a hardcopy document. An "image output device" (IOT) is a device that can receive an item of data defining an image and provide the image as a visual output. A "xerographic marking engine" is an image output device that provides the output image in hardcopy document form.

An operation performs "image processing" when it operates on an item of data that relates to part of an image. A "morphological" or "logic-based" operation operates using logical operators (e.g., AND, OR, INV, NOT) applied to a digital image. In particular, the logic operations are typically applied in association with a "structuring element" such as an aperture having a predefined shape or other set of characteristics.

A number of morphological operations map a source image onto an equally sized destination image according to a rule defined by a pixel pattern called a structuring element (SE). The SE is defined by a center location and a number of pixel locations, each having a defined value (ON or OFF for the binary case, with Grey-scale morphology all intermediate levels are allowed). The pixels defining the SE do not have to be adjacent each other. The center location need not be at the geometrical center of the pattern; indeed it need not even be inside the pattern.

"Erosion" is a morphological operation wherein a given pixel in the destination image is turned ON if and only if the result of superimposing the SE center on the corresponding pixel location in the source image results in a match between all ON pixels in the SE and On pixels in the underlying pixels in the source image.

"Dilation" is a morphological operation wherein a given pixel in the source image being ON causes the SE to be written into the destination image with the SE center at the corresponding location in the destination image.

Turning to FIG. 1, depicted is a region of an image as at a diagonal edge 100 on an image shape 102. For this image in the original data a pixel is 300 by 300 dots per inch (dpi). At that resolution diagonals will exhibit distinct jagged stair-case transitions in the edge 100 of the image shape 102.

Figure 2:
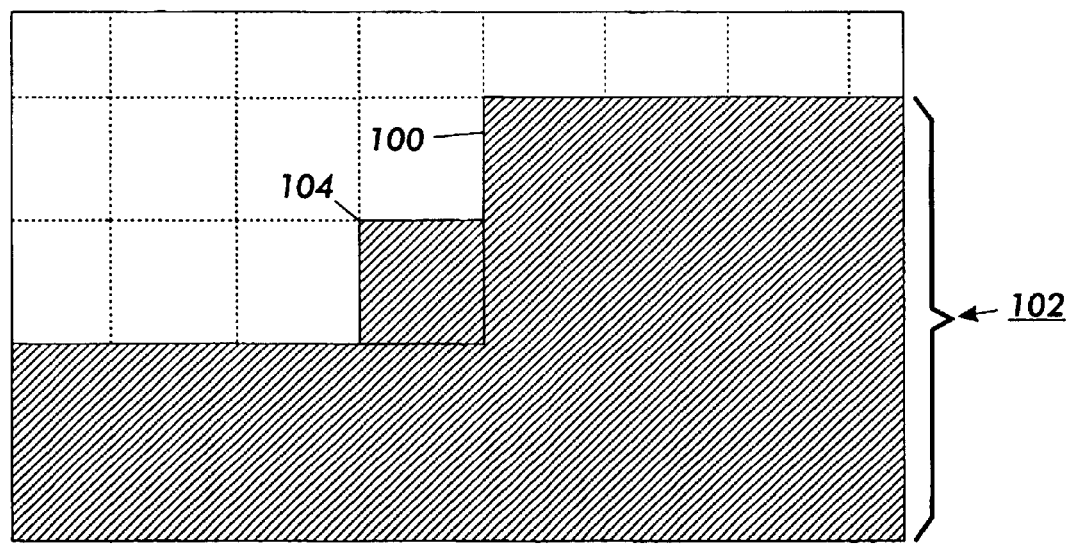
FIG. 2 the line from FIG. 1 smoothed by templates and rendered at 600×600 dpi.

FIG. 2 shows a possible result to the data in FIG. 1 after expansion to 600×600 dpi by means of pattern matching templates and application of Resolution Enhancement Technology (RET). RET is a technique that smoothes out the jagged stair-case transition resulting from digitization by inserting an added pixel 104. This new added pixel is at the higher dpi resolution directly adjacent the edge 100 of image shape 102. The RET illustrates how edge detection and the controlled insertion of new pixel into a given bit map is well understood in the digital imaging arts.

Figure 3:
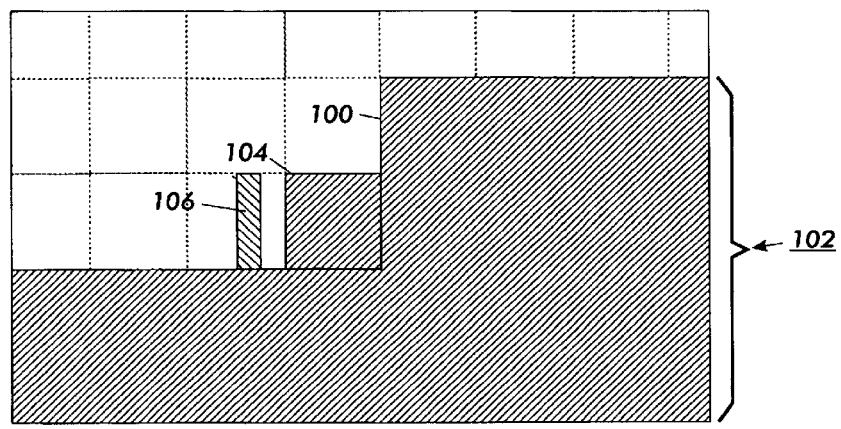
FIG. 3 the line from FIG. 2 with non-printing auxiliary dots.

In FIG. 3 there is an example of non-printing "auxiliary" pixels as applied to the data found in FIG. 2. The RET generated added pixel 104 is retained. However, ultra fine pixels herein referred to as "non-printing" pixels, or "auxiliary" pixels as substituted into the bitmap, have been placed close to the exterior of edge 100 on image shape 102. It should be noted that the RET generated pixel 104 is retained in FIG. 3 for illustrative purposes only, it is not required for the present invention and in a preferred embodiment may in fact be replaced by a suitable auxiliary pixel. The auxiliary pixel 106 (and patterns of same) are used to modulate the toner cloud density and distance from the photoreceptor during development.

The present invention is directed to fringe field tailoring pixels. Fringe field tailoring pixels operate in much the same manner, and are applied to image data in the same ways, as auxiliary pixels. As such the addition of fringe field tailoring pixels to a digital image will move the toner cloud toward or away from the photoreceptor in the neighborhood of an area to be developed, much as it does for auxiliary pixels. The fringe field tailoring pixels will produce small attractively biased areas on the photoreceptor. This will encourage the toner cloud close enough to the photoreceptor to mitigate the spreading effect of the surrounding cleaning field. Thus, fringe field tailoring pixels will have an effect upon original pixels which they neighbor. The result is that the development cloud (or a development brush) will not be repelled as much from surrounding white areas because of the fringe field tailoring pixels. In the absence of fringe field tailoring pixels the normal component of the field at the edge is essentially null, whereas the tangential component is very large. This leads to a strong deflection of toner towards the center of the image. The fringe field tailoring method allows to tailor the field so that the normal component of the field at the edge is large, whereas the tangential component is zero or very small. Toner particles are hence attracted to the edge, and subject to little deflection towards the center of the line. In this way fringe field tailoring pixels will enhance the printing of original pixels in a manner as intended by the original aerial bit map and mitigate the edge displacement and halo problems endemic to increased printing system speed and throughput. Just as with auxiliary pixels, numerous options exist for placement of fringe field tailoring pixels to use this effect to advantage. The optimal option is selected based on the specifications of the development subsystem specifications, the material properties and the quantitative assessment of the physical behavior of the subsystem.

Figure 4:
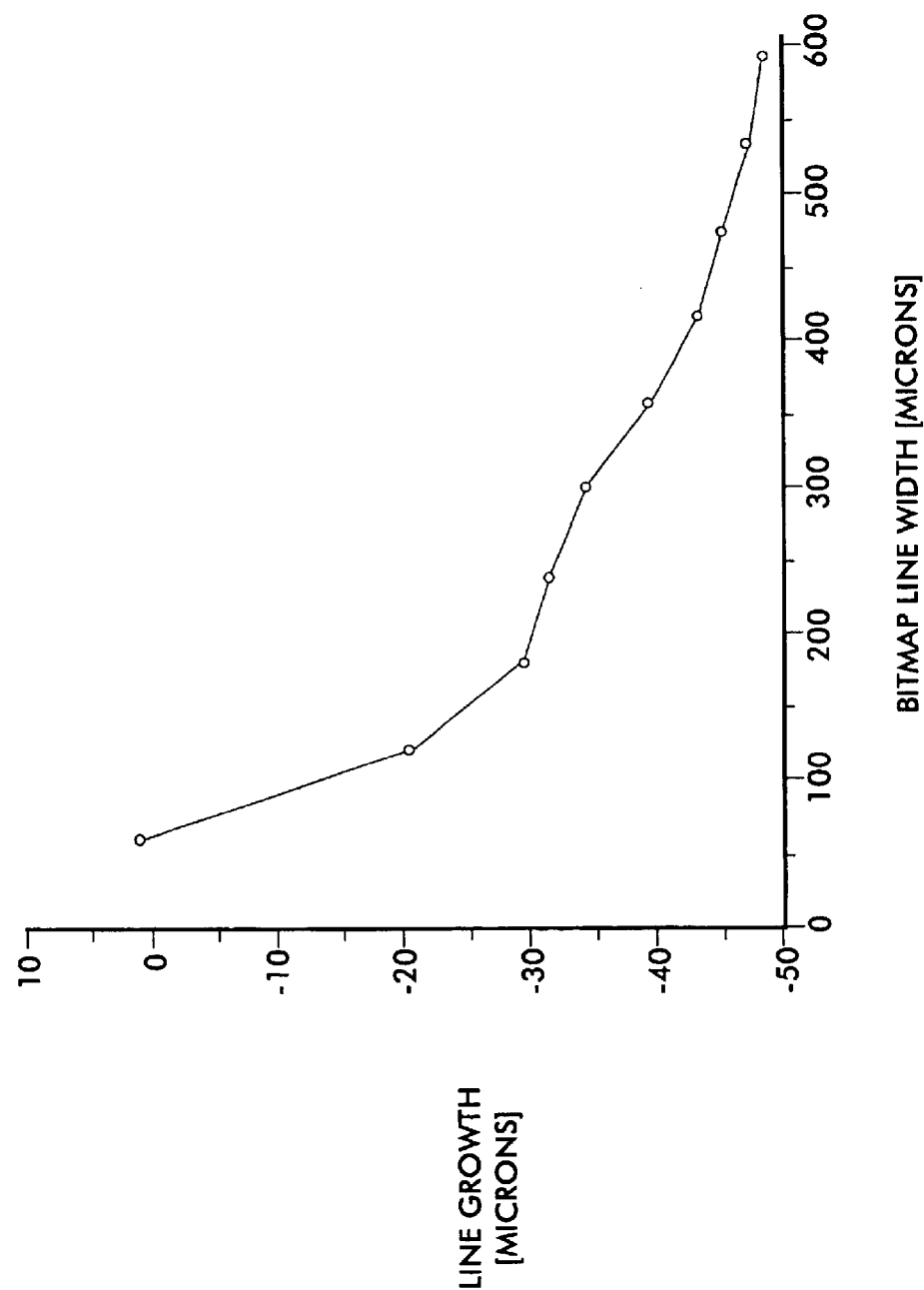
FIG. 4 is a graph of empirically observed line growth for parallel positive lines.

FIG. 4 depicts a typical negative line growth found with parallel positive lines for a particular machine setup. This data substantiates the progressive line narrowing for positive (that is, black on white background) parallel lines. The wider the line, the greater the amount of line shrinkage. The strong demand for toner in the middle of the line "recruits" toner from the edge of the line, thus further reducing supply at the edge. An exemplary manner for examining this effect is in terms of the electric field components as found on and relative to the photoreceptor. A ratio may be monitored of the tangential component of the field $E_t$, divided by the normal component of the field $E_n$. The larger the ratio $E_t/E_n$, the more line shrinkage to occur. For narrow lines this ratio is relatively small, because the effect of the transition from a cleaning field to a development field on one edge of the line is somewhat offset by the cleaning field on the opposite side of the line. As the line grows wider, the two edges grow farther apart, and the ratio $E_t/E_n$ grows until it reaches full saturation at a width of about 1000 microns or 1 mm. Thus this negative line growth has been observed to be a result of edge displacement. The present invention is directed to overcoming this problem.

The origin of edge displacement and the resulting lead edge deletion image defect is best understood in terms of the physics of the toner cloud development process. When a toner cloud developer subsystem is not printing, the toner cloud is repelled from the photoreceptor by a cleaning field. When the latent image on the photoreceptor changes from background (i.e., no developed toner) to image (developed toner desired), the directions of the fields in the space above the photoreceptor change directions, from a repelling or cleaning field to an attractive or developing field. This is accompanied by the usual fringe field effects. Since the toner cloud is initially some distance from the photoreceptor, there is a finite time that it takes the cloud to respond to the field and reach the photoreceptor. This cloud motion time depends on the tribo of the toner in the cloud and the development field strength. During this finite time no toner is being developed on the latent image, and edge displacement on both sides of the line results. The amount of edge displacement on the image then increases a function of this cloud motion time, and the speed of the photoreceptor with respect to the developer housing. Thus, the edge displacement problem becomes worse as the process speed increases. The invention here solves this problem with fringe field tailoring pixels instead of auxiliary pixels.

Figure 5:
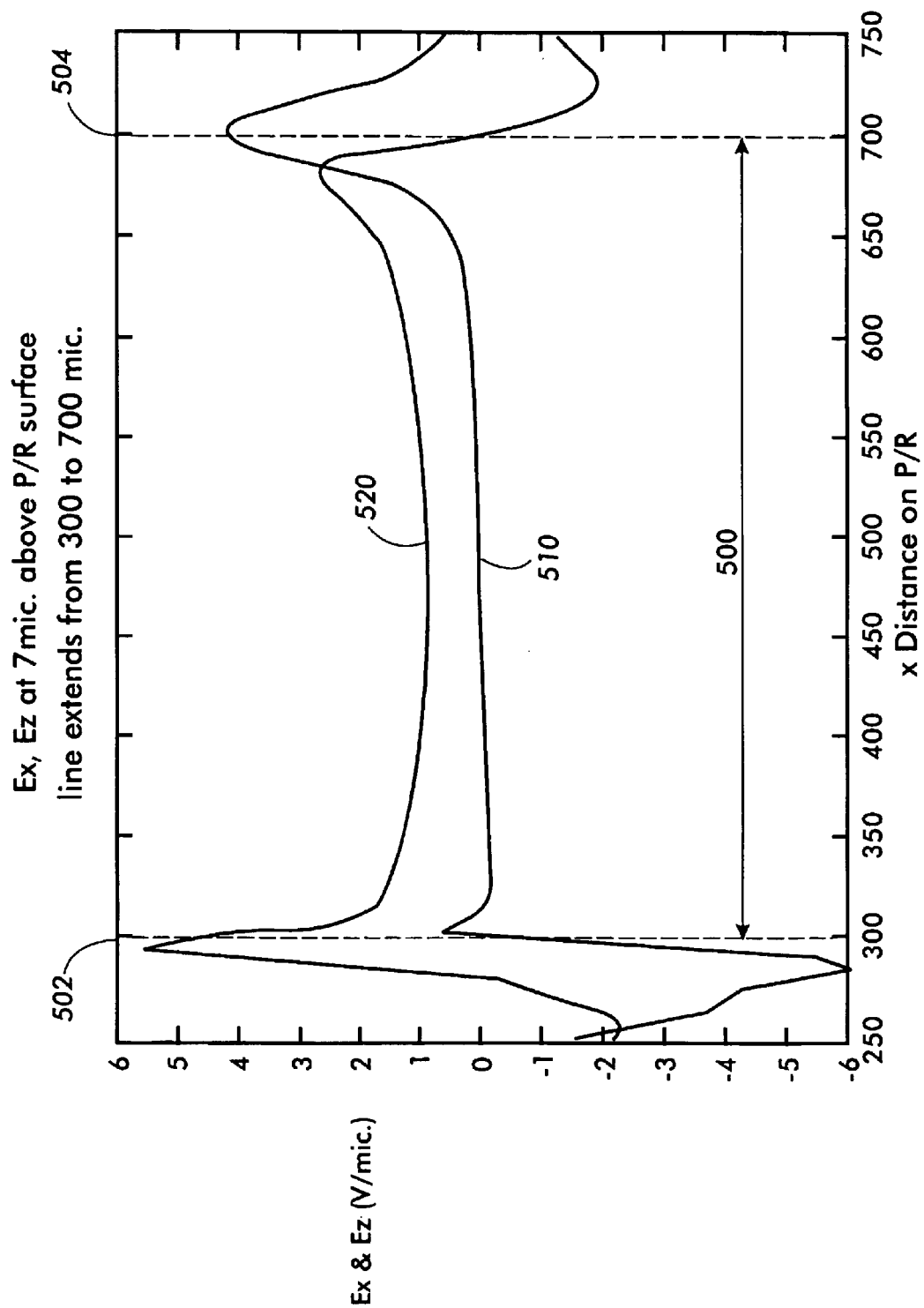
FIG. 5 is a depiction of the normal and tangential electric fields above a 300 micron wide line as developed on a photoreceptor and as measured seven microns from above that photoreceptor.

FIG. 5 depicts an exemplary manner in which to look at the physics in operation and thus develop an appropriate fringe field tailoring pixel to overcome edge displacement problems. The chart in FIG. 5 plots the electric fields as found seven microns above a photoreceptor in an area where a line image has been developed. The line 500 is four hundred microns wide. The left edge 502 of line 500 is located at a distance of three hundred microns out onto the photoreceptor, and the right edge 504 of line 500 is located at a distance of seven hundred microns out onto the photoreceptor as may be seen on the plot. The left edge 502 of line 500 has been treated with fringe field tailoring as per the invention. However, the right edge 504 has not been so treated and so represents a typical image edge.

Two components of the electric field as found above the photoreceptor are plotted in FIG. 5. The first is the tangential field curve 510, which represents the field which tends to pull toner towards the center of an image shape or line. The second field curve is the normal field curve 520, which indicates the field component which tends to pull toner onto the photoreceptor. Examining the untreated right edge 504 we see tangential field curve 510 reaches a peak right at the line edge 504. The tangential field tends to push toner away from the photoreceptor. At the same line edge location 504, we see as indicated by curve 520 that the normal field strength which pulls toner to the photoreceptor, is approaching zero. The net electric field effect is failure to pull toner onto the photoreceptor, and instead push it tangentially toward the middle of the line. It is in this manner that edge development fails.

Contrast that result with the result provided at left line edge 502 which has been treated with fringe field tailoring as per the present invention. As indicated by curve 510 the tangential field strength is nearly zero so there is little pull of the toner towards the middle of the line. Meanwhile, the normal field strength as indicated by curve 520 is at a desirable maximum. In this way the tailored fringe field is now strongly pulling the toner as desired onto the photoreceptor at the edge and thus the halo, edge displacement, edge delineation, and other "slow toner" effects are defeated.

Figure 6:
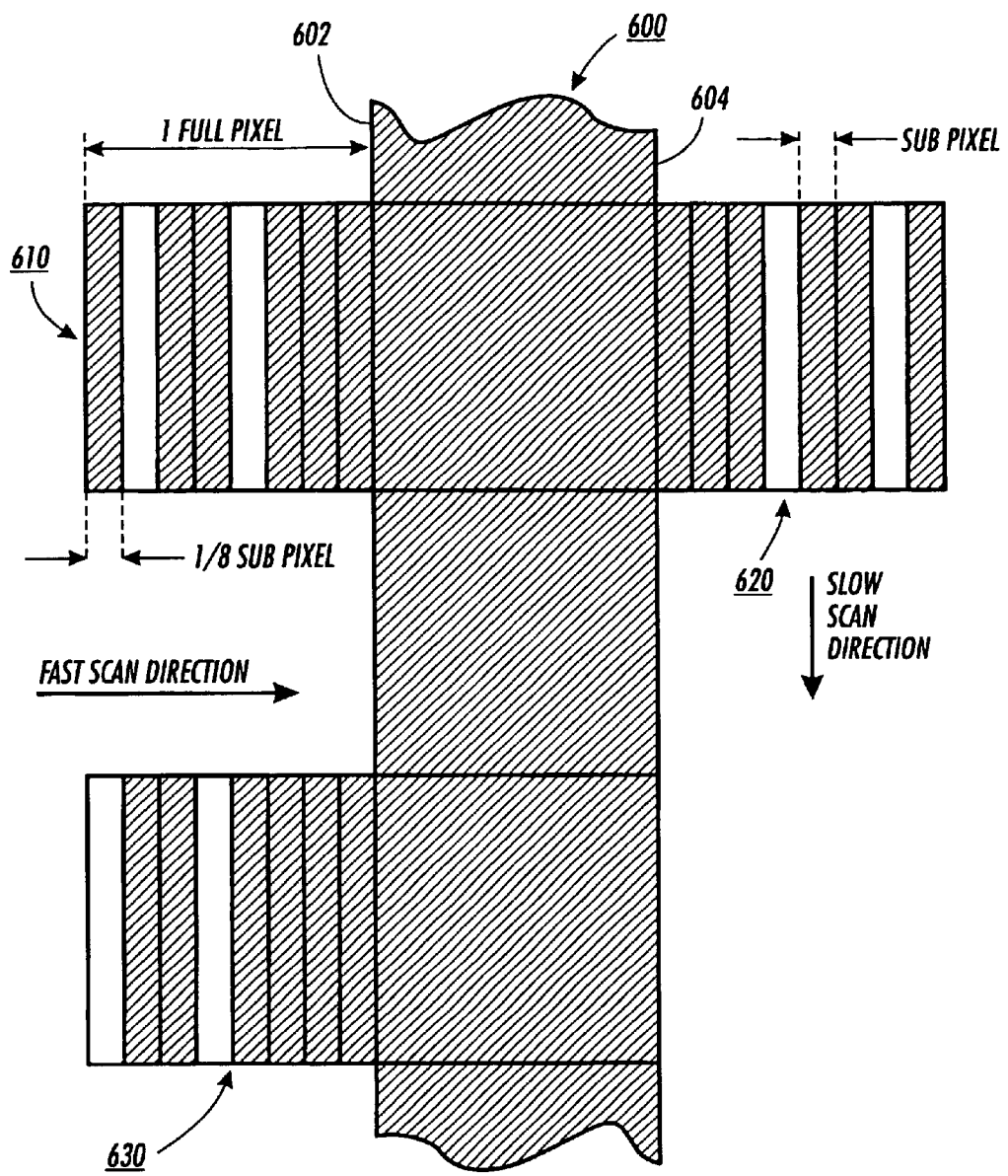
FIG. 6 is part of a narrow one pixel wide line with sub-pixel pattern examples as per the invention.

FIG. 6 depicts a preferred embodiment of the present invention. The fast scan direction for the system runs from left to right as indicated. The slow scan direction is from top to bottom as indicated. Leading and lagging edges perpendicular to the fast scan direction will first suffer the adverse affects of "slow toner". While edges perpendicular to the slow scan direction eventually suffer too, there is an earlier and considerably more pronounced effect with edges perpendicular to the fast scan direction. Therefore, a preferred embodiment will treat only edges that are perpendicular to the fast scan direction.

In FIG. 6 a one pixel wide line 600 is shown. Line 600, as oriented, runs perpendicular to the fast scan printing direction of a digital imaging system and so has a leading left edge 602 and a lagging right edge 604. A preferred embodiment fringe field tailoring pixel 610 is located directly adjacent to a line 600 at the leading left edge 602. In a preferred embodiment a fringe field tailoring pixel measures one pixel in width and height. A mirror image of the pixel 610 pattern is provided on the lagging edge 604 of line 600 as a fringe field tailoring pixel 620.

Fringe field tailoring pixel 610 is a sub-pixel patterned pixel. In a preferred embodiment, the pixel is divided into eight equal sub-pixel parts. Different patterns of these sub-pixels are pulsed on and off to achieve the optimum fringe fields as disclosed in FIG. 5 for edge 502. The optimum pattern will vary according to system geometry and process speed. However a preferred embodiment pattern, as found in fringe field tailoring pixel 610 is as follows: the leading sub-pixel is "on"; the following sub-pixel is "off"; the next two sub-pixels are "on"; followed by another single "off" sub-pixel; and finally the last three of eight sub-pixels are "on". This pattern is mirrored about the y-axis to create fringe field tailoring pixel 620 for application directly adjacent to lagging edges like lagging edge 604.

It must be emphasized that the depiction in FIG. 6 is that of a bit map and as such is the image data for driving a pulsed laser. It is not representative of the developed result as might be found on a photoreceptor. The sub-pixel pattern is achieved with high-addressability image output techniques. High addressability is well understood within the art and U.S. Pat. No. 5,274,472 to Williams, is exemplary of that technique and herein is incorporated by reference in its entirety for its teaching.

In a preferred arrangement every pixel in a given shape which is located upon a leading or lagging edge receives a fringe field tailoring pixel immediately adjacent to it and outside the shape. This is what is depicted for fringe field tailoring pixel 610 which is shown as adjacent the topmost first full pixel in line 600. The second full pixel from the top is depicted without any adjacent fringe field tailoring pixels only for the clarity of FIG. 6. In a preferred embodiment both a fringe field tailoring pixel 610 and a fringe field tailoring pixel 620 would be adjacently placed on the line edges 602 and 604 respectively. A similar liberty has been taken in FIG. 6 with the third full pixel from the top as shown in line 600. Only the leading edge 602 is shown with a fringe field tailoring pixel 630. In a preferred arrangement there would be a fringe field tailoring pixel for the lagging edge 604 as well.

Fringe field tailoring pixel 630 is provided as an alternative preferred embodiment. Remember, as the cloud distance from the photoreceptor decreases, the amount of edge displacement decreases. But, as the system speed increases, the edge displacement increases. So an optimum pattern will vary according to system geometry and process speed. Here fringe field tailoring pixel 630 provides a pattern which will accommodate greater system speed, that pattern being as follows: the leading sub-pixel is "off"; the following two sub-pixels are "on"; the next single sub-pixel is "off"; and finally the last four of eight sub-pixels are all "on". A mirror image of this pattern along the y-axis would be employed on the lagging edge 604 in a preferred embodiment.

Figure 7:
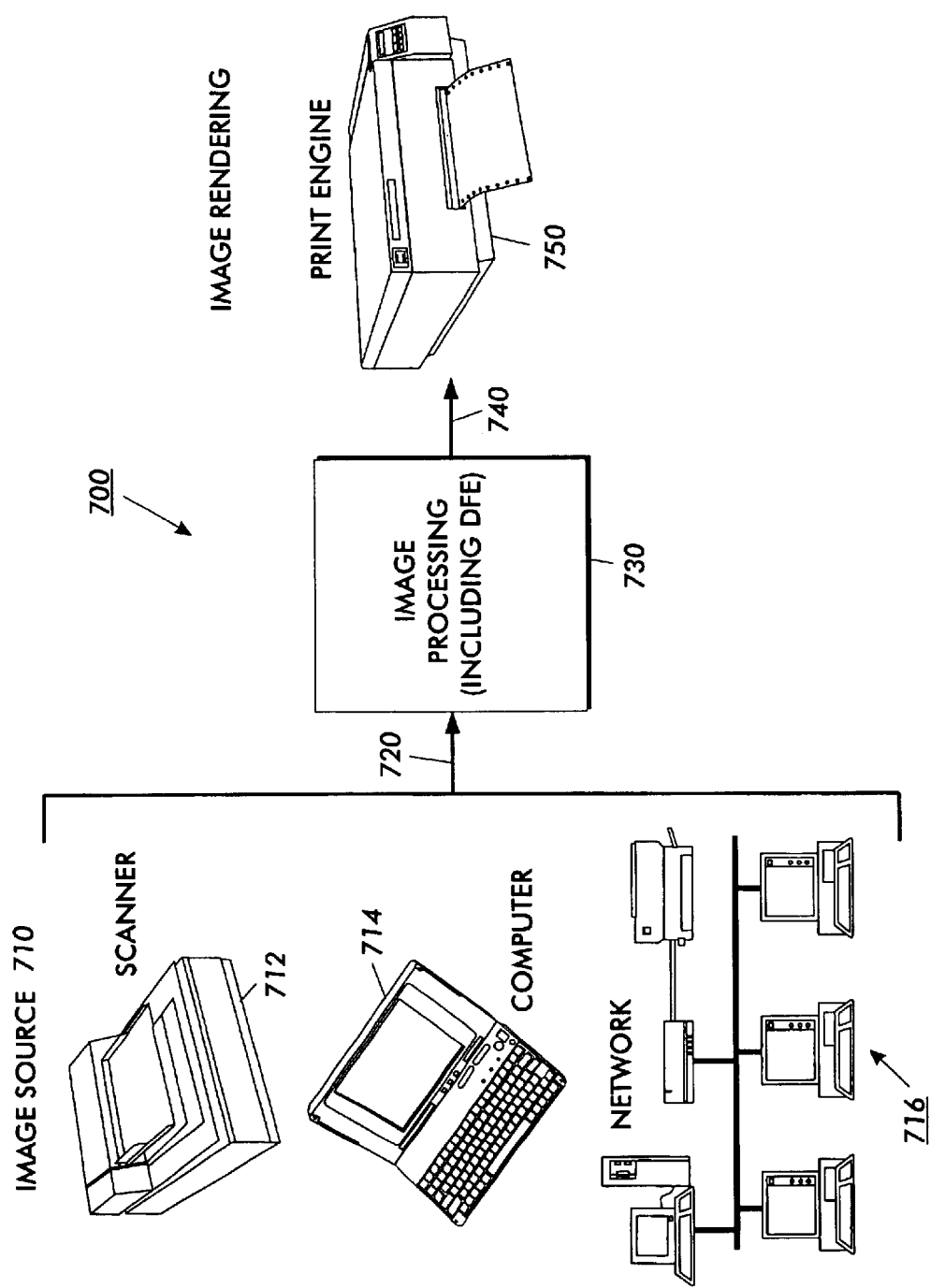
FIG. 7 is a general representation of a suitable system-level embodiment for the invention.

Turning now to FIG. 7, there is shown an embodiment of a digital imaging system 700 that incorporates the features of the present invention. Digital imaging system 700 includes image source 710 that may include scanner 712, computer 714, network 716 or any similar or equivalent image input terminal (IIT) to generate original input image data 720. Image data 720, representing an image to be printed, is supplied to an image processing system 730, that may incorporate what is known in the art as a digital front end (DFE). Image processing system 730 process the received original image data 720 to produce print ready binary data 740 that is supplied to print engine 750. In response to print ready data 740, print engine 750 generates an output document or print image on suitable media. Print engine 750 is preferably a electrostatographic or electrophotographic engine; however, engine 750 may include an equivalent alternative, for example ionographic. The present invention is directed towards aspects of image processing system 730 depicted in FIG. 7. In particular, the present invention is directed to embedding fringe field tailoring pixels into image data 720.

There are a variety of approaches apparent to those skilled in the art that may be taken in image processing system 730 for processing received original image data 720 so as to produce binary data 740 with embedded auxiliary pixels. It will also be appreciated by those skilled in the art that the exact type and pattern of fringe field tailoring pixel utilized will vary depending upon the particulars of print engine 750. One approach comprises essentially the steps of storing the incoming data 720 in a buffer or memory; replicating or copying incoming data 720 in a memory work space; performing a dilation upon the work space data followed by; a morphological outline to that result, then; substituting the appropriate auxiliary pixel for all "on" pixels in the outline data as contained in the work space, and; finally performing a morphological Boolean OR operation of that work space result upon the original incoming data 720 as stored in a buffer memory (or upon a copy of the original incoming data 720). This will place fringe field tailoring pixels adjacent all edges, including those edges which are in the slow scan direction.

In a preferred embodiment approach, only leading and lagging edges to the fast scan direction are treated. There are many ways of achieving this as is known by those skilled in the art. One approach may be taken using template matching. For example, with a three by three window the center of which is stepped across every pixel address, the pattern of "on" to "off" pixels within that window is compared with templates stored in a look-up table. Based upon that comparison a determination is made as to whether to embed a fringe field tailoring pixel at that address. One pass could be made to locate all the leading edge locations, and a second pass to locate all the lagging edge locations for embedding the appropriate fringe field tailoring pixels.

Thus by introducing fringe field tailoring pixels into the bitmap of an image, local control of the image development is obtained by modification of local electric fields in the development nip. Using fringe field tailoring pixels positions the toner cloud by modulating these electric fields and may also compensate for cleaning field and toner supply effects. Fringe field tailoring pixels in combination with the methods and apparatus discussed above can better position the toner cloud particularly for very narrow lines and ensure adequate toner supply to all parts of the image so that the desired printing pixels will print as intended and in this way overcome edge displacement, image halo, and slow toner problems.

While the embodiment disclosed herein is preferred, it will be appreciated from this teaching that other variations or examples may be made by those skilled in the art. For example other embodiments would include: ionographic systems; brush roller toner delivery systems; and CEP—Contact Electrostatic Printing or similar charged cake toner delivery systems. Also the preferred pattern of sub-pixels will vary with the print system, the properties of materials and the precise specification and dimensions of the print system. Based on the physics we described herein, it will be apparent to the skilled in the art that the preferred pattern can be arrived at by either numerical and computer calculations, analytical calculations or direct experimentation. However, these examples are not exhaustive, nor is there any intent to exclude various alternative, modifications, variations or improvements therein from being encompassed by the following claims.

What is claimed is:

1. An improved print image, comprising:
an original image including a plurality of original pixels comprising at least one shape, the shape having at least one edge forming an interior and an exterior to the shape; and
a fringe field tailoring pixel including a sub-pixel pattern having both "on" and "off" sub-pixel values, replacing one of the plurality of original pixels, the fringe field tailoring pixel being arranged exterior and adjacent to the shape edge for enhancing the printing of the original image.

2. The improved print image of claim 1, wherein the sub-pixel pattern comprises at least two pulses.

3. The improved print image of claim 1, wherein the sub-pixel pattern comprises one-quarter pixel increments.

4. The improved print image of claim 1, wherein the sub-pixel pattern comprises one-eighth pixel increments.

5. The improved print image of claim 1, wherein the sub-pixel pattern comprises one-sixteenth pixel increments.

6. The improved print image of claim 1, further comprising additional fringe field tailoring pixels, which are continuously adjacent along one of the edges and exterior of the original image shape.

7. The improved print image of claim 6, wherein the additional fringe field tailoring pixels are arranged in a pattern and substituted for a corresponding pattern of original pixels in the original image.

8. The improved print image of claim 7, wherein the pattern of additional fringe field tailoring pixels is a dispersed array close to a shape edge found in the original image.

9. The improved print image of claim 6, further comprising additional fringe field tailoring pixels, which are continuously adjacent along the leading and lagging edges and exterior of the original image shape.

10. A method for improving the printing of an image, comprising:
receiving a source image comprising original pixel data; and
processing the source image original pixel data by morphological manipulating the original pixel data to substitute fringe field tailoring pixels for original data pixels therein.

11. The method of claim 10, wherein the step of morphologically manipulating includes embedding fringe field tailoring pixels on the leading and lagging edges of image shapes.

12. The method of claim 10, wherein the step of morphologically manipulating comprises:
storing the source image in a first memory space;
replicating the source image as a working image in a second memory space;
dilating the working image to produce a first resultant working image;
outlining the first resultant working image to produce outline pixels in a second resultant working image;
substituting fringe field tailoring pixels for the outline pixels in the second resultant working image; and,
performing an OR operation of the second resultant working image with the source image in the first memory space, to thus produce fringe field tailoring pixels in the source image at those pixel locations corresponding to the outline data in the second resultant working image.

* * * * *